United States Patent [19]
Huxsoll et al.

[11] 3,759,160
[45] Sept. 18, 1973

[54] PROCESS FOR PEELING POTATOES

[75] Inventors: Charles C. Huxsoll; Robert P. Graham, both of El Cerrito; Merle L. Weaver, Martinez, all of Calif.

[73] Assignee: The United States of America as represented by the Secretary of Agriculture, Washington, D.C.

[22] Filed: Aug. 11, 1971

[21] Appl. No.: 170,939

[52] U.S. Cl. ............................................. 99/233.3
[51] Int. Cl. ............................................. A23n 7/02
[58] Field of Search .................... 146/231, 235, 232; 99/233.5

[56] References Cited
UNITED STATES PATENTS

| 3,517,715 | 6/1970 | Graham et al. | 146/231 |
| 3,115,174 | 12/1963 | Loveland | 146/232 |
| 3,370,627 | 2/1968 | Willard | 146/231 X |

Primary Examiner—Willie G. Abercrombie
Attorney—R. Hoffman et al.

[57] ABSTRACT

The potato peel is loosened by a double treatment with hot lye solution, each treatment being followed by a holding period. The potato is subsequently exposed to radiant heat and the loosened peel is removed in the dry state by brushing.

5 Claims, 1 Drawing Figure

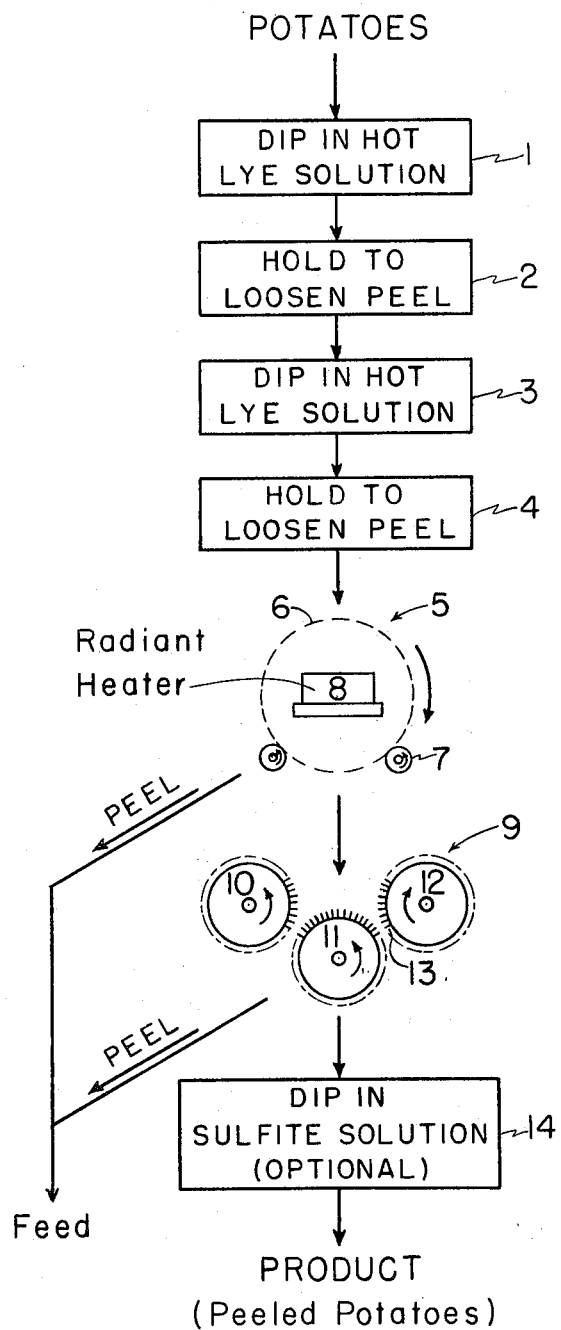

PROCESS FOR PEELING POTATOES

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for peeling potatoes. More particularly, the invention provides procedures which not only give efficient peeling results but also which form waste material which is readily disposable. In addition, the process reduces shattering during subsequent cutting operations. Further objects of the invention will be evident from the following description wherein parts and percentages are by weight unless otherwise specified.

The FIGURE in the annexed drawing is a schematic diagram or flow sheet of the process of the invention.

In conventional practice in food processing plants, potatoes are peeled by applying the following procedure: The potatoes are immersed in hot lye solution—e.g., a solution containing about 20 percent NaOH and maintained at about 180°–200° F. The potatoes are held in the lye solution until the peels are softened and loosened. Then, the tubers are removed and subjected to strong jets of water while rotated or tumbled about to expose all surfaces to the jets whereby the lye-loosened skin is flushed off the tubers. Although this procedure provides effective peeling, it has the disadvantage that it produces a large volume of wash water containing organic matter and sodium hydroxide. The disposal of this waste liquor presents a serious problem. If discharged directly into a stream it causes pollution of the water course. Moreover, biological destruction by ponding or the like is slow and inefficient, particularly because of the high alkalinity of the liquor. Of course, the liquor could be neutralized but this would involve additional expense for acid and for equipment for metering the acid and maintaining a predetermined pH. Because of the present emphasis by federal, state, and local governments on pollution control, food processors who rely on the procedure in question are facing a crisis—they must devise a disposal system which not only meets anti-pollution standards, but also does the job economically so that they can stay in business. A failure to meet these criteria means that the operations must be shut down.

In a previous U.S. Pat. No. (3,517,715 by Graham, Huxsoll, Hart, and Weaver, hereinafter referred to as 715) a process was described whereby potatoes were peeled in the dry state. This process involved an initial treatment with lye followed by heating with radiant heat and removal of the loosened peel by dry-brushing. Indeed, 715 obviated some of the problems outlined above by eliminating the conventional step of removing the lye-loosened peel with water, thereby reducing caustic usage and peel loss. However, certain other problems remain. These include the deleterious effects of shattering and the difficulty in removing the green layer without destruction of a large portion of the potato flesh.

A primary object of the invention is the provision of peeling methods which obviate the problems outlined above. A particular feature of the invention is the substantial reduction of caustic usage and peel loss in comparison to 715 as well as conventional methods. Said reduction is obtained by employing two lye-dipping steps, each followed by a holding period. The so-treated potato is then subjected to infrared heating and peeled by dry-brush techniques.

The primary advantage of the invention is the large reduction in the amount of sodium hydroxide consumed in the lye treatment. The degradation of the peel is promoted by the action of lye on the cellular material. The invention overcomes excessive use of lye in the following way: The first lye treatment deposits a thin film of caustic on and in the surface layers of peel tissue. Then, the potato is held for a period of time to allow the lye to penetrate and attack said tissue. The potato is again subjected to hot caustic to supplement the first treatment. Finally, the so-treated potato is held for a period of time to complete the cellular destruction. In previous processes much more concentrated lye solutions were required because disintegration of the peel resulted solely from the strength of the caustic. The present invention is effective because of its combination of lye-dipping steps and holding periods, said combination providing a menas for metering an amount of lye necessary (but not excessive) to loosen the peels. Thus, peeling is accomplished with a minimum expenditure of caustic. In addition, since much less concentrated caustic is necessary for the peeling, less lye is lost due to the actual physical adherence of droplets to the surface of the potato. By application of the invention the amount of caustic consumed during operations is reduced by about a factor of 4 from about 0.2 to 0.6 lb. of sodium hydroxide per 100 lbs. of potatoes (loss occurring in present processes including 715) to 0.05 to 0.1 lb. of sodium hydroxide per 100 lbs. of potatoes (loss occurring in the invention). Since the cost of lye is a major contributor to the total expenses incurred by the processor, the savings to the potato industry will be substantial.

As with 715, the process of the invention does not yield a liquid waste material. It yields a solid waste which can be converted to feed for livestock or other useful products.

In addition, the process of the invention provides effective peeling so that the peeled tubers are adapted for all conventional uses as in preparing dehydrated, prefried frozen, canned, and other potato products. The peeling losses usually average only about 3 to 9 percent depending on the age of the potato. The invention also provides for better removal of eyes and other defects for a given amount of peel loss.

Another advantage of the invention is that it reduces shattering and is, therefore, superior to all other potato-peeling processes including 715. Shattering occurs at times as a result of the high turgidity of certain tubers. After the potatoes are peeled, they are cut into pieces, for example, strips for French fries, etc. Shattering usually occurs during cutting as the tubers are contacted by the blade and leaves the potatoes with crack marks throughout. Usually, such minor crevices give undesirable dark-colored lines and absorb excess oil when the potato strip is fried. However, in extreme cases the strips break along the shattering lines and the product is useless.

Still another advantage of the invention is that the green layer, found randomly dispersed along the surface of non-mature potatoes, is effectively removed. If not removed, said layer can lead to an undesirable product. The problem is that the green layer is very resistant to the action of caustic, while the peel of the immature tuber is delicate and very little lye is needed to loosen same. By employing the techniques of the invention, removal of the green layer is accomplished with minimum destruction of the fleshy tissue of the potato. Removal of a large portion of such fleshy material in certain areas so that holes remain is known in the art as "cratering."

In a practice of the invention, pototoes are first contacted with aqueous lye (NaOH). This is best done by immersing the tubers in the lye solution. Alternatively, the lye solution may be applied by spraying, brushing, or the like. Generally, the solution will contain about 1 to 10 percent of NaOH. The concentration of caustic depends on the maturity of the tubers to be peeled. Freshly harvested potatoes have thin skins, and defects such as eyes are not very deep. Consequently, only a minimum amount of lye is needed to loosen the peel. Thus, the potato is dipped in about 1 to 10 percent hydroxide for approximately 5–30 seconds. On the other hand, tubers which have been stored have thicker skins and deeper defects, thus necessitating the use of about 5–10 percent sodium hydroxide for a period of approximately 30–60 seconds. In both cases the caustic is kept hot, i.e., at about 150°–212° F. so it will penetrate rapidly into the corky tissue of the peel. As a general rule, the conditions should be adjusted such that the concentration of lye and the temperature are as low as possible to produce the desired peeling.

Next, the lye-treated potatoes are held at ambient temperature for a period of approximately 30–60 minutes to allow the lye time to destroy the peel tissue. Alternately, the potatoes may be either maintained in warm air or heated with steam. If the former conditions are used, the temperature of the warm air may be varied over a wide range. However, good results are attained at about 120°–160° F. The warm air dries the caustic on the surface, thereby increasing the caustic concentration. Additional heat applied to the peel during the warm air treatment further accentuates the degradative action of the lye. If the latter conditions are employed, the potatoes may be heated with steam at about 100°–150° F. for about 5–30 minutes. Often, it is desirable to hold the potatoes at ambient temperature for about 3 to 5 minutes prior to and immediately after the treatment with steam. In this way the lye can penetrate the peel tissue and the application of steam will not dilute the caustic, thereby decreasing its disintegrative powers. The particular conditions employed are again subject to the maturity of the tubers, more severe conditions being necessary to loosen the thick peel of mature potatoes.

After said holding period, the potatoes are again treated with caustic. In this case the potatoes are dipped in about 2–10 percent sodium hydroxide at about 150°–212° F. for approximately 30–60 seconds. The strength of the lye is dependent on the severity of the conditions of the first lye treatment. Generally, if the lye solution in the first step is concentrated, the amount of caustic necessary in the second treatment is small and vice versa. Moreover, the quantity of lye in this step should be as low as necessary to finish the destruction of the peel.

The so-treated potatoes are subjected to another holding period from approximately 1–10 minutes, usually at ambient temperature. This step allows the second lye treatment to be most effective in loosening the remainder of the peel.

Next, the lye-treated potatoes are exposed to radiant heat supplied, for example, by conventional radiant heaters which provide elements brought to incandescence (i.e., at least 1,200° F.) by electrical power, or by combustion of propane or other gaseous or liquid fuels. Particularly preferred are the modern gas-fired devices used for heating patios, outdoor restaurants, etc. These heaters include a porous ceramic plate treated with a catalyst. Propane or natural gas is fed through the plate and burns over the entire surface thereof, bringing the plate to incandescence and thereby providing a large area from which radiant energy is uniformly emitted. Since radiant energy is effective only when a line of sight between source and the area to be heated is established, it is necessary to provide some arrangement to ensure that all points on the surfaces of the potatoes come into such relationship with the radiant source. For example, one may provide a drum within which is located a radiant heater. The lye-treated potatoes are fed into the drum which is then rotated. As the drum rotates the potatoes roll and tumble about so that all surfaces thereof are exposed to the energy emitted by the radiant source. Another plan is to convey the lye-treated potatoes under a bank of radiant elements while the potatoes are supported on a conveyor equipped with rollers, vibrators, or other suitable means to roll or tumble the tubers so that uniform exposure of all surfaces will be attained.

By exposure of the lye-treated potatoes to radiant heat, various desirable effects are attained—the peel is heated, moisture in the peel is evaporated, and the lye solution in and on the peel is concentrated, i.e., made more caustic. These effects co-act to expedite hydrolytic destruction of the binding substances in the peel and those which hold the peel to the flesh. The net result is that the potatoes are rapidly brought to a state where the peel is in a loosened state so that it can readily be removed. The time of exposure to radiant energy required to achieve this state will vary depending on several factors such as the variety of potatoes, the maturity thereof, and particularly the amount of radiant energy applied to the tubers. The proper time for a specific batch of potatoes exposed to a particular radiant source is readily determined by testing the tubers at intervals and discontinuing the treatment when the peels are loose and readily removable. In many cases this can be done by observation, since when the potatoes appear dry on the surface they are ready for the next operation. A critical factor is that the treatment should not be so severe as to cause charring or burning of the peel. If this occurs at least part of the peel is converted into a black smudgy material which becomes smeared over the tubers during the subsequent operation (peel removal). In other words, when it is attempted to remove the charred peel by applying friction the equipment becomes smeared with the clinging sooty char which is then transferred onto the surface of the peeled tubers. The net result is that the peeled potatoes are not clean—as they are when the conditions of radiant heat application are limited to attain peel loosening—but are dirty. They are stained with deposits of sooty material. Accordingly, in such case washing with water is essential to obtain a satisfactory product. In sum, where charring takes place, peel removal in the dry state is not feasible and one must resort to washing —with its attendant problems—as in conventional procedures. Moreover, there is the matter of flavor. When charring occurs various empyreumatic substances are produced which exhibit most disagreeable odors and tastes. The potato flesh absorbs some of these offensive substances with the result that the product is substandard—it exhibits foreign odor and taste and cannot be used until it is pared to remove the tainted layers of flesh.

After application of radiant heat as above described, the potatoes are subjected to friction—for example, brushing—applied in the dry state. Excellent results are obtained by contacting the potatoes with a rotating cylinder, the surface of which is covered with protruding fingers of soft rubber, Neoprene, or other elastomer. The non-abrasive brushing effect obtained by the action of these fingers striking against the tubers causes the loosened peel to be dislodged quickly and without removal of any significant amount of potato flesh. Moreover, the peeling action is so effective that even the peel at indented areas (eyes) is removed. For large-scale operations, one may provide several drums (provided with soft rubber fingers) arranged with their axes parallel, and driven in such manner that each adjacent pair of drums rotate in opposite directions. By applying the treated potatoes to such an arrangement the tubers are continuously rolled and tumbled while being brushed by the rubber fingers, and the loosened peel is quickly dislodged.

Following removal of the peels the potatoes may be given a dip in dilute sulfite solution to prevent discoloration of the tubers.

The practice of the invention is further illustrated by the annexed drawing. Referring thereto, the potatoes to be peeled are first dipped in hot lye solution 1 and then held in unit 2 to loosen the peel and to raise the temperature of the center of the potato so that shattering is reduced. The so-held potatoes are dipped in hot lye solution 3 and held in unit 4 to complete the loosening process. From 4 the potatoes are introduced into radiant heating unit 5. This unit includes a drum 6 of perforated metal, supported and rotated by rollers 7. Within drum 6 is located a radiant heater 8 which directs radiant energy downwardly. As drum 6 rotates, the lye-treated potatoes are rolled and tumbled about so that all surfaces are exposed to the radiant energy. After this, the potatoes are fed to the peeling unit, generally designated as 9, which includes rollers 10, 11, and 12, each driven in the directions indicated by the arrows. The surface of each of the rollers is covered with protruding fingers 13 of soft rubber. In a typical installation wherein rollers 10, 11, and 12 have a diameter of about 8 inches, excellent peeling effects are obtained where rollers 10, 11, and 12 are rotated at about 450–600 rpm. In a preferred arrangement, rollers 10, 11, and 12 are arranged with their axes parallel and sloping so that the potatoes will gradually be conveyed from the high end of the tier of rollers to the low end, while being brushed and tumbled about by the co-action of the rollers and thereby producing a clean, peeled product. After peeling, the potatoes may be given a brief dip in sulfite solution to prevent discoloration. The peeled potatoes are then ready for processing into any selected end product by conventional procedures. Suitable trays, pans, or the like may be positioned beneath rollers 10, 11, and 12 to receive the bits of peel brushed off the potatoes. Ordinarily, some peel is detached from the potatoes during the treatment in radiant heater unit 5, and this refuse material may be likewise collected in trays or pans. As noted above, the removed peel is a granular meal which can be readily collected.

EXAMPLE

The invention is further demonstrated by the following illustrative example.

Potatoes (U.S. 1 Russet Burbank, 0–1 month old) were weighed and then dipped in an aqueous solution of 5 percent sodium hydroxide at 190° F. for 30 seconds. The potatoes were removed from the bath and held 1 hour at ambient temperature. Then, the tubers were dipped in 5 percent sodium hydroxide at 190° F. for 30 seconds, removed from the bath, and held at ambient temperature for 3 minutes. The so-treated potatoes were placed in a rotating drum made of perforated metal and mounted with its axis horizontal. A propane-fired radiant heater having a power output of 30,000 B.t.u. per hour was positioned within the drum, and oriented so that the radiant heat was directed against the potatoes which were then tumbled about at the bottom of the drum. Exposure to the radiant heat was maintained for about 60 seconds.

The treated potatoes were then subjected to brushing by the action of a rotating drum, the surface of which was covered with protruding soft rubber fingers. The peel—including that in the eyes—was quickly and effectively removed by this brushing action. Weighing of the product indicated that the average peeling loss was 4 percent. The consumption of sodium hydroxide was determined by standard procedures and expressed in pounds per 100 pounds of potatoes.

The aforementioned experiment was repeated for several types of potatoes, namely U.S. 1 (2–4 months old), U.S. 1 (6–8 months old), U.S. 2 (6–8 months old), and freshly-harvested Russet Burbanks, the peels of which were largely green. The conditions in each case were varied. The results are summarized below.

| Type of potato | First dip | First hold | Second dip | Second hold | Heat | Peel loss, percent | Consumption of NaOH [1] |
|---|---|---|---|---|---|---|---|
| US #1 Russet Burbank (0–1 mo. old) | 5% NaOH, 190° F., 30 sec. | 1 hr., ambient | 5% NaOH, 190° F., 30 sec. | 3 min., ambient | 1 min | 4.0 | 0.05 |
| US #1 (2–4 mos. old) | 5% NaOH, 190° F., 1 min. | do | 5% NaOH, 190° F., 1 min. | do | do | 4.0 | 0.07 |
| US #2 (6–8 mos. old) | 10% NaOH, 190° F., 30 sec. | 30 min., ambient | 5% NaOH, 190° F., 30 sec. | do | do | 9.3 | 0.08 |
| Russets (green) | 1% NaOH, 150° F., 15 sec. | 1 hr., ambient | 10% NaOH, 170° F., 30 sec. | do | do | [2] 3.7 | 0.08 |
| US #1 (6–8 mos. old) | 10% NaOH, 190° F., 30 sec. | 10 min., 140° F. air; 20 min., ambient. | 5% NaOH, 190° F., 30 sec. | do | do | 7.5 | 0.08 |

[1] Lbs./100 lbs. potatoes.
[2] No cratering, good removal of green layer.

Having thus described our invention, we claim:

1. A process for peeling potatoes, which comprises—
   a. applying a hot lye solution to unpeeled potatoes,
   b. holding the so-treated potatoes at ambient temperature for about 30–60 minutes,
   c. Applying a hot lye solution to the potatoes, said solution being at a temperature essentially the same as that of the lye solution in Step a,
   d. holding the so-treated potatoes at ambient temperature for about 1–10 minutes,
   e. exposing the said potatoes to radiant heat, and
   f. removing the loosened peels by non-abrasive dry brushing.

2. The process of claim 1 wherein Step a is carried out under the following conditions —
   i. the concentration of lye is about 1 to 10 percent,
   ii. the temperature of the lye solution is about 150°–212° F., and
   iii. the duration of application of the lye solution is about 5 to 60 seconds.

3. The process of claim 1 wherein Step c is carried out under the following conditions —
   i. the concentration of lye is about 2 to 10 percent,
   ii. the temperature of the lye solution is about 150° to 212° F., and
   iii. the duration of application of the lye solution is about 30 to 60 seconds.

4. A process for peeling potatoes, which conprises —
   a. applying a hot lye solution to unpeeled potatoes,
   b. holding the so-treated potatoes about 3 to 5 minutes at ambient temperature, then about 5–30 minutes during which time steam is applied to them, and then about 3–5 minutes at ambient temperature,
   c. applying a hot lye solution to the potatoes, said solution being at a temperature essentially the same as that of the lye solution in Step a,
   d. holding the so-treated potatoes at ambient temperature for about 1–10 minutes,
   e. exposing the said potatoes to radiant heat, and
   f. removing the loosened peels by non-abrasive dry brushing.

5. A process for peeling potatoes, which comprises —
   a. applying a hot lye solution to unpeeled potatoes,
   b. holding the so-treated potatoes about 10–20 minutes in warm air at about 120°–160° F.,
   c. applying a hot lye solution to the potatoes, said solution being at a temperature essentially the same as that of the lye solution in Step a,
   d. holding the so-treated potatoes at ambient temperature for about 1–10 minutes,
   e. exposing the said potatoes to radiant heat, and
   f. removing the loosened peels by non-abrasive dry brushing.

* * * * *